No. 734,460. PATENTED JULY 21, 1903.
L. O. GILLILAND.
HEATING STOVE.
APPLICATION FILED NOV. 24, 1902.
NO MODEL.
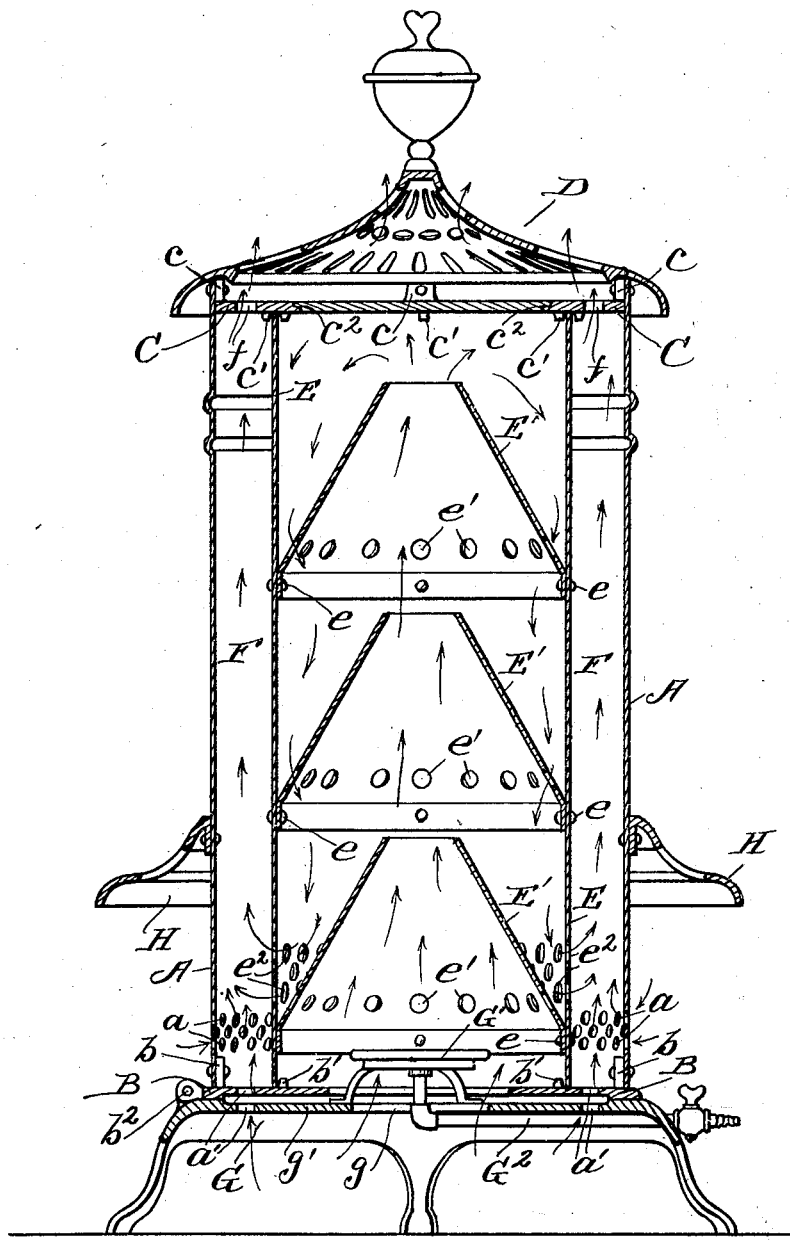
Witnesses:
R. J. Jacker
Annie M. Adam
Inventor:
Lee O. Gilliland
By Jno. H. Whipple
Atty.

No. 734,460. Patented July 21, 1903.

UNITED STATES PATENT OFFICE.

LEE O. GILLILAND, OF CHICAGO, ILLINOIS, ASSIGNOR OF ONE-HALF TO REINHOLD REICHARDT, OF CHICAGO, ILLINOIS.

HEATING-STOVE.

SPECIFICATION forming part of Letters Patent No. 734,460, dated July 21, 1903.

Application filed November 24, 1902. Serial No. 132,538. (No model.)

*To all whom it may concern:*

Be it known that I, LEE O. GILLILAND, of Chicago, in the State of Illinois, have invented certain new and useful Improvements in Heating-Stoves, of which the following is a specification.

The invention relates to gas-stoves used chiefly for warming purposes and having an interior and an exterior casing; and the object of the improvements is to provide means for producing a circulation of heated currents of air within the interior casing and discharging the same therefrom near the bottom into the exterior casing and there mixing the same with air drawn into the exterior from the outside and escaping through the top of the exterior casing. I have attained this object in the stove constructed as illustrated in the accompanying drawing, which is a vertical central section of the same.

In the drawing, A is the exterior casing, preferably cylindrical in form and secured to a bottom plate B, having lugs $b$, through which and the casing rivets are applied, and to a top plate C, having lugs $c$, in a similar manner.

D is a perforated top piece adapted to fit over the top of the exterior casing.

E is the interior casing, which is provided with a series of conic deflectors E', open at the top and secured to the casing inside at $e$ by means of rivets. The deflectors are provided near the base with a horizontal row of perforations $e'$. The interior casing is held in place between the plates B C by means of lugs $b'$ $c'$, so as to provide open space F between it and the exterior casing. Openings $e^2$ in the interior casing at the part near the base of the lowermost deflector and extending clear around the casing are provided, which communicate with the space F near the bottom. The exterior casing is also provided with similar openings $a$ near the bottom, by means of which the space F communicates with the outer atmosphere. That portion of the plate C which covers the space F is provided with numerous openings $f$.

G is the base of the stove, which has a large central opening at $g$ under the burner G', supported on the base-plate $g^2$ and connected with the gas-supply pipe $G^2$.

The plate B is hinged at $b^2$ to the stove-base and has a large central opening sufficient to pass over the burner when the stove is turned over on the hinge. The plate B and base-plate $g^2$ also have an annular row of holes $a'$, through which the space F communicates with the atmosphere under the stove-base. An ornamental piece or foot-rail is attached near the base of the outer casing.

The top plate C may be provided with a large central opening at $c^2$ $c^2$ to be stopped by a suitable cover. This opening should remain closed always while using the stove as a heater. The top D may be lifted off.

In operation the stove is turned over on the hinge at $b^2$ to afford access to the burner in lighting the gas. The air to the burner passes in through the large central opening at $g$ and the ascending heated air passes out of the deflectors at the openings in the top thereof in a column central to the interior casing, impinges the plate C, then descends next to the wall of the interior casing, passing through the openings $e'$, next passes out through the openings $e^2$ into the lower portion of the space F, and thence up through openings $f$ and out through the perforated top D. By this operation an increased upward draft is created in the spaces F, which causes the outer atmosphere down near the floor to be drawn in through the openings $a$ $a'$ and mixed with the current thus circulated through the interior casing and intensely heated thereby. The air being drawn in at the central opening to the burner at the base of the stove is intensely heated while ascending and then passed outwardly and down along the wall within the interior casing, causing it to be highly heated, and the air near the floor taken in through the openings $a$ $a'$ is passed along the exterior of this hot surface and discharged at the top of the outer casing in order to produce an increased circulation of the air in the room where the stove is placed.

What is claimed is—

1. In a heating-stove of the class described the combination with an exterior casing provided with a perforated portion extended around near the base and open at the top, of an interior casing provided with a perforated portion extended around near the base and closed at the top, and a series of conic deflectors open at the top and provided with a row of perforations near the base, the said deflectors being arranged one above the other within the interior casing, the base of the deflectors fitting closely therein as specified.

2. In a stove of the class described the base provided with a large central opening and a burner over said opening, in combination with an exterior casing having a perforated portion extended around the same near the base and being open at the top, an interior casing having a perforated portion extended around the same near the base and being closed at the top, and a series of conic deflectors open at the top, provided with a row of perforations near the base, and closely fitted within the interior casing as specified.

3. In a stove of the class described the base provided with a large central opening, an annular row of openings near the outer edge, and a burner over the central opening, in combination with an exterior casing having a perforated portion extended around the same near the base and being open at the top, an interior casing having a perforated portion extended around the same near the base and being closed at the top, and a series of conic deflectors open at the top, provided with perforations at the base and closely fitted within the interior casing as specified.

LEE O. GILLILAND.

Witnesses:
ANNIE M. ADAMS,
VERNON T. FERRIS.